United States Patent
Sun et al.

(10) Patent No.: US 11,632,838 B2
(45) Date of Patent: Apr. 18, 2023

(54) CIRCUIT FOR REDUCING A NOISE SIGNAL

(71) Applicant: Dialog Semiconductor (UK) Limited, London (GB)

(72) Inventors: Junyue Sun, Tanjin (CN); Yufeng Zou, Tianjin (CN); Huibin Cao, Tianjin (CN); Zhenyu Song, Beijing (CN)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/121,092

(22) Filed: Dec. 14, 2020

(65) Prior Publication Data

US 2021/0105878 A1    Apr. 8, 2021

Related U.S. Application Data

(63) Continuation of application No. PCT/CN2018/093048, filed on Jun. 27, 2018.

(51) Int. Cl.
*H05B 45/345* (2020.01)
*H05B 45/14* (2020.01)

(52) U.S. Cl.
CPC ........... *H05B 45/345* (2020.01); *H05B 45/14* (2020.01)

(58) Field of Classification Search
CPC .... H05B 45/34; H05B 45/345; H05B 45/397; H05B 45/14; G05F 1/10; G05F 1/26; G05F 1/561
See application file for complete search history.

(56) References Cited

U.S. PATENT DOCUMENTS

| | | | | |
|---|---|---|---|---|
| 4,288,707 A | * | 9/1981 | Katakura | H03H 11/46 323/352 |
| 5,914,638 A | * | 6/1999 | He | H03F 3/45977 330/258 |
| 6,522,114 B1 | | 2/2003 | Bakker et al. | |
| 6,541,946 B1 | | 4/2003 | Chen et al. | |
| 6,822,514 B1 | * | 11/2004 | Aude | H03F 1/14 330/260 |
| 9,326,335 B1 | * | 4/2016 | Milanesi | G01R 19/16538 |
| 2004/0166814 A1 | * | 8/2004 | Balmain | B64G 1/546 455/72 |

(Continued)

FOREIGN PATENT DOCUMENTS

| | | |
|---|---|---|
| CN | 201233548 Y | 5/2009 |
| CN | 103631301 A | 3/2014 |

(Continued)

OTHER PUBLICATIONS

Kong, CN 201233548 Y, PDF version of original document (Year: 2009).*

(Continued)

*Primary Examiner* — Abdullah A Riyami
*Assistant Examiner* — Syed M Kaiser
(74) *Attorney, Agent, or Firm* — Saile Ackerman LLC; Stephen B. Ackerman

(57) ABSTRACT

A negative feedback circuit, comprising a node, and a control circuit coupled to the node, wherein the control circuit is configured to provide a stabilizing signal in response to a noise signal coupling to the node from a power rail, and the stabilizing signal is configured to reduce the noise signal at the node and the power rail.

18 Claims, 10 Drawing Sheets

(56) References Cited

U.S. PATENT DOCUMENTS

| | | | |
|---|---|---|---|
| 2008/0068298 A1* | 3/2008 | Shen | G09G 3/14 345/46 |
| 2008/0315795 A1* | 12/2008 | Madineni | H05B 45/325 315/307 |
| 2009/0039869 A1* | 2/2009 | Williams | H01L 24/48 324/123 R |
| 2010/0182755 A1* | 7/2010 | Maejima | H01L 29/7835 361/748 |
| 2011/0163730 A1* | 7/2011 | Zhang | H02M 3/158 323/234 |
| 2012/0057261 A1* | 3/2012 | Poulton | H04B 3/56 327/87 |
| 2013/0200800 A1* | 8/2013 | Waser | H05B 45/00 315/121 |
| 2013/0342124 A1* | 12/2013 | Huang | H05B 45/46 315/210 |
| 2014/0055112 A1 | 2/2014 | Pigott | |
| 2015/0185747 A1* | 7/2015 | Liu | G05F 3/30 323/268 |
| 2017/0194855 A1 | 7/2017 | Petenyi | |
| 2019/0089244 A1* | 3/2019 | Koski | H02M 7/003 |
| 2019/0199287 A1* | 6/2019 | Kuwano | H03B 5/04 |

FOREIGN PATENT DOCUMENTS

| | | | | |
|---|---|---|---|---|
| CN | 107015593 A | | 8/2017 | |
| CN | 107306467 A | | 10/2017 | |
| EP | 2256580 A3 | * | 5/2011 | G05F 3/30 |
| WO | 2014/188391 A1 | | 11/2014 | |
| WO | 2020/000238 A1 | | 1/2020 | |

OTHER PUBLICATIONS

Kong, CN 201233548 Y, PDF version machine translation (Year: 2009).*

PCT Search Report and Written Opinion, International Application No. PCT/CN2018/093048, Applicant: Dialog Semiconductor (UK) Limited, dated Mar. 27, 2019, 9 pages.

German Office Action, File No. 11 2018 007 763.2, Applicant: Dialog Semiconductor (UK) Limited, dated Apr. 29, 2022, 8 pages.

* cited by examiner

CIRCUIT FOR REDUCING A NOISE SIGNAL

This application is a Continuation application (DS18-033G_CON) of application no. PCT/CN2018/093048, filed on Jun. 27, 2018, owned by a common assignee, and which is herein incorporated by reference in its entirety.

TECHNICAL FIELD

The present disclosure relates to a negative feedback circuit. In particular, the present disclosure relates to a negative feedback circuit for reducing a noise signal on a node and on a power rail. The negative feedback circuit may be used to reduce the noise sensitivity of a current regulator for regulating a current through a circuit element, such as a light emitting diode, when the current regulator is implemented on a printed circuit board (PCB).

BACKGROUND

A current regulator may be used to provide and regulate a current flowing through a circuit element, such as a light emitting diode (LED). A current regulator is also suitable for use with multiple LEDs. An LED lighting system may comprise a current regulator and one or more LEDs. An example application of such an LED lighting system includes, but is not limited to, LED backlighting to provide illumination, as is shown in FIG. 1A and FIG. 1B.

FIG. 1A shows an LED lighting system 100 which comprises a plurality of LED strings 102, which each comprise a plurality of LEDs. The plurality of LED strings 102 may be coupled together to form an LED matrix. The LED lighting system that is shown is implemented on an aluminum printed circuit board (PCB). The LED lighting system 100 as shown in FIG. 1 is an example of a solid state lighting (SSL) backlighting system. FIG. 1B shows an alternative LED lighting system 104 that is implemented on an aluminum PCB.

Aluminum PCBs are widely used for alternating current (AC) LED applications and SSL back lighting systems due to their excellent thermal conductivity which enables fast dissipation of heat out of the linear regulator to the heat sink of the system. However, due to the structure of the aluminum PCB there is a significant noise coupling effect when compared with noise coupling in other PCB types, such as FR-4 PCB. Noise coupling may, for example, result from capacitive coupling or inductive coupling.

FIG. 2 shows an exploded view of an aluminum PCB layer structure 200 which comprises a dielectric layer 202 sandwiched between two metal layers 204, 206. A first metal layer 204 comprises copper and a second metal layer 206 comprises aluminum. The tracks to form the appropriate connections for the required circuit application are formed in the copper layer 204. The dielectric layer 202 provides a thin insulation film and the aluminum layer 206 forms a thick base layer and provides good thermal and electrical conductivity.

It will be appreciated that the term "sandwiched" may include arrangements whereby the dielectric layer 202 directly contacts one or both of the first metal layer 204 and the second metal layer 206; and also arrangements whereby the first metal layer 204 and the second metal layer 206 are not in direct contact with the dielectric layer 202. Generally, the dielectric layer 202 will be provided between the first metal layer 204 and the second metal layer 206. Furthermore, there may be additional layers between each of the first and second metal layers 204, 206 and the dielectric layer 202.

FIG. 3 shows a cross section of an aluminum PCB layer structure 300 comprising a dielectric layer 302, three copper tracks 304, 306, 308, and an aluminum base layer 310.

Due to the conductivity of the aluminum base layer 310, any signals at one of the three copper tracks 304, 306, 308 will typically be capacitively coupled to the other copper tracks 304, 306, 308 through the aluminum base layer 310. The tracks may alternatively be referred to as "traces". This is illustrated in FIG. 3 by the inclusion of parasitic capacitances represented by capacitor circuit symbols 312, 314, 316.

The capacitive coupling results in greater noise on the signals in a circuit implemented on the aluminum PCB when compared to other PCB types such as FR-4 PCB. Noise coupling in an aluminum PCB can be particularly problematic for LED lighting applications.

SUMMARY

It is an object of this disclosure to provide a circuit that provides reduced noise coupling effects. The circuit may be applied to a current regulator implemented on a PCB.

According to a first aspect of the disclosure there is provided a negative feedback circuit, comprising a node, and a control circuit coupled to the node, wherein the control circuit is configured to provide a stabilizing signal in response to a noise signal coupling to the node from a power rail, and the stabilizing signal is configured to reduce the noise signal at the node and the power rail.

Optionally, the negative feedback circuit comprises a resistive element, wherein the node is coupled to a first voltage via the resistive element, the node is coupled to a second voltage, and the first voltage is greater than the second voltage.

Optionally, the control circuit comprises an amplifier, and a switching element, wherein the amplifier has a first input coupled to a reference voltage, a second input coupled to the node, and an output coupled to the switching element, the amplifier provides a control signal to control the switching element, and the switching element generates the stabilizing signal.

According to a second aspect of the disclosure there is provided an apparatus comprising a printed circuit board comprising a power rail, a negative feedback circuit, comprising a node, and a control circuit coupled to the node, wherein the control circuit is configured to provide a stabilizing signal in response to a noise signal coupling to the node from the power rail, and the stabilizing signal is configured to reduce the noise signal at the node and the power rail.

Optionally, the printed circuit board comprises a dielectric layer sandwiched between two metal layers.

According to a third aspect of the disclosure there is provided an apparatus comprising a current regulator for regulating a current through a circuit element, comprising a node, a control circuit configured to provide a first current at the node, and a negative feedback circuit, comprising the node, and the control circuit coupled to the node, wherein the control circuit is configured to provide a stabilizing signal in response to a noise signal coupling to the node from a power rail, and the stabilizing signal is configured to reduce the noise signal at the node and the power rail.

Optionally, the negative feedback circuit comprises a resistive element, wherein the node is coupled to a first voltage via the resistive element, the node is coupled to a second voltage, and the first voltage is greater than the second voltage.

Optionally, the control circuit comprises an amplifier, and a switching element, wherein the amplifier has a first input coupled to a reference voltage, a second input coupled to the node, and an output coupled to the switching element, the amplifier provides a control signal to control the switching element, and the switching element generates the stabilizing signal.

Optionally, the amplifier is configured to regulate the first current at the node, and the first current is dependent on the control signal received by the switching element.

Optionally, the current regulator is configured to regulate a second current using the first current.

Optionally, the current regulator comprises a current mirror configured to mirror the first current, wherein the mirrored first current is the second current.

Optionally, the current mirror operates as a current amplifier, such that the second current is equal to the first current multiplied by a factor that is greater than one.

Optionally, the circuit element corresponds to one or a plurality of light emitting diodes.

Optionally, the circuit element is coupled to the power rail.

Optionally, the apparatus comprises a printed circuit board comprising the power rail.

Optionally, the printed circuit board comprises a dielectric layer sandwiched between two metal layers.

Optionally, the apparatus comprises the circuit element.

Optionally, the printed circuit board comprises a dielectric layer sandwiched between two metal layers.

Optionally, the circuit element corresponds to one or a plurality of light emitting diodes.

Optionally, the current regulator comprises a current mirror configured to mirror the first current, wherein the mirrored first current is a second current, and the circuit element is coupled to the current mirror such that the circuit element receives the second current.

According to a fourth aspect of the disclosure there is provided a method of operating an apparatus comprising a negative feedback circuit, wherein the negative feedback circuit comprises a node and a control circuit, the control circuit being coupled to the node, the method comprising providing, from the control circuit, a stabilizing signal in response to a noise signal coupling to the node from a power rail, and reducing the noise signal at the node and the power rail using the stabilizing signal.

Optionally, the negative feedback circuit is implemented on a printed circuit board.

Optionally, the apparatus comprises a current regulator comprising the node, the control circuit and the negative feedback circuit, the method comprises providing, using the control circuit, a first current at the node.

It will be appreciated that the method of the fourth aspect may include providing and/or using the features set out in the previous aspects and can incorporate other features as described herein.

BRIEF DESCRIPTION OF THE DRAWINGS

The disclosure is described in further detail below by way of example and with reference to the accompanying drawings, in which.

DETAILED DESCRIPTION

Figures 4A, 4B:
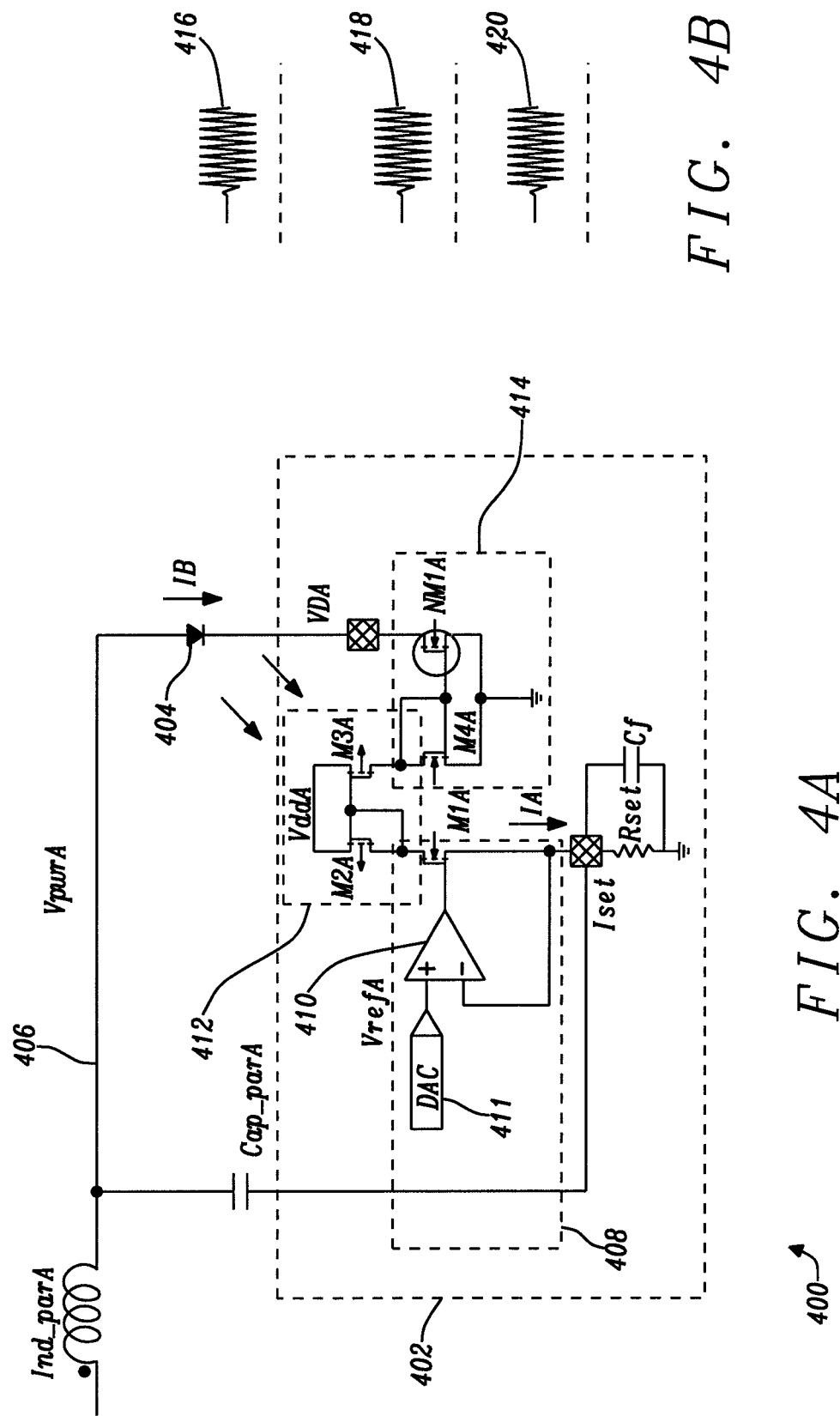
FIG. 4A is a schematic of an LED lighting system and FIG. 4B shows traces of voltages and a current within the LED lighting system.

FIG. 4A shows a schematic of an LED lighting system 400 comprising a current regulator 402 and an LED 404 which can be used with an aluminum printed circuit board (Al PCB). A current regulator may also be referred to as an LED driver, a linear LED lighting driver, a linear current amplifier or a linear current regulator.

A power rail 406 is coupled to a first terminal of the LED 404 and the current regulator 402 is coupled to a second terminal of the LED 404. The power rail is at a power rail voltage VpwrA. The power rail voltage VpwrA may be generated directly using wall utility power for AC LED applications or may be generated using a DC/DC converter in an SSL backlighting system.

The current regulator 402 comprises a control circuit 408, a setting resistor Rset, a filter capacitor Cf, a current setting pin Iset and two current mirrors 412, 414. The control circuit 408 comprises an amplifier 410. The current setting pin Iset, may be referred to as a node.

In operation the current regulator 402 regulates a current IB through the LED 404. The control circuit 408 provides a current IA at the current setting pin Iset. The current IA is then amplified by the current mirrors 412, 414 to provide the current IB. Typically, the current IA is amplified by a factor ranging from 100 to 1000 in the generation of the current IB for power saving purposes. The current IA may be referred to as the current setting current and the current IB may be referred to as the LED current. In summary, the current flowing through the LED 404 (the current IB) is controlled by the current at the current setting pin Iset (the current IA). The setting resistor Rset may be set by a user to set the current IB. A user may set the current IB for the LED 404, by setting the current IA at the current setting pin Iset.

The amplifier 410 has an input coupled to a digital to analog converter (DAC) 411 which provides a reference voltage VrefA, an input coupled to the current setting pin Iset and an output coupled to a gate of a transistor M1A. The current IA is dependent on the reference voltage VrefA and therefore can be used to control the current IB.

The DAC 411 may function as a controller to control the reference voltage VrefA, which can be used to control the current IB. The DAC 411 is therefore able to enable or disable the LED 404. The LED 404 may be enabled when the current IB is sufficiently large to illuminate the LED 404, and the LED 404 may be disabled when the current IB is sufficiently small, or reduced to zero, such that the LED 404 is not illuminated.

The current mirror 412 is coupled to a supply voltage VddA and mirrors the current IA to the current mirror 414 but does not amplify the current IA. The current IA is amplified by the current mirror 414 to provide the current IB. The current mirror 412 comprises two transistor M2A, M3A and the current mirror 414 comprises two transistors M4A, NM1A.

The supply voltage VddA is typically lower than the power rail voltage VpwrA. The supply voltage VddA may be generated by the power rail voltage VpwrA by using appropriate power conversion circuitry, such as Zener clamping, Bang-Bang loop controller or a low dropout regulator (LDO). Typically, a sufficiently large power supply rejection ratio (PSRR) and a sufficiently large filter capacitor coupled to the supply voltage VddA will prevent noise on the power rail 406 having a substantial effect on the supply voltage VddA.

Alternatively, the supply voltage VddA may be generated/provided independently of the power rail voltage VpwrA. For example, the supply voltage VddA may be provided by other chips or instruments that are independent of the power rail voltage VpwrA.

Noise on the power rail 406 can result in an oscillation of the power rail voltage VpwrA. Noise may result from factors relating to the external environment, for example AC line noise in AC LED applications or DC/DC regulator dynamic response ripple in an SSL backlighting system. The noise will couple to the current setting pin Iset through the Al PCB and as a result the current IA will be altered. A parasitic capacitance Cap_parA is shown on FIG. 4A to illustrate the noise coupling path from the power rail 406 to the current setting pin Iset. It will be appreciated that the parasitic capacitance Cap_parA is not a component that is physically implemented in the circuit and is only shown to represent the parasitic capacitance resulting from the Al PCB.

Also shown on FIG. 4A is a parasitic inductance Ind_parA on the power rail 406. As for the parasitic capacitance Cap_parA, the parasitic inductance Ind_parA is not a component that is physically implemented in the circuit, and the circuit symbol is only shown to represent the parasitic inductance on the power rail 406.

The variation of the current IA due to noise results is an in-phase noise signal being coupled into the power rail 406 via the parasitic inductance Ind_parA, which will then be coupled back into the current setting pin Iset and the current IA via the parasitic capacitance Cap_parA. As a result, a positive feedback loop comprising the power rail 406 and the current setting pin Iset is formed. The positive feedback loop can result in large oscillations on the current IB flowing through the LED 404 which can lead to instability and reliability issues.

For example, a noise signal resulting in a decrease of the power rail voltage VpwrA at the power rail 406 can result in an increase of the current IA which will result in an increase of the current IB. Due to the positive feedback loop, the increase in the current IA will result in a further decrease of the power rail voltage VpwrA, which will result in a further increase of the current IA and a further increase of the current IB.

A local negative feedback loop (410+M1A+Rset) is formed by the amplifier 410, the transistor M1A and the setting resistor Rset. In the present example, the transistor M1A is an NMOS transistor. The local negative feedback loop (410+M1A+Rset) acts to ensure that a current setting pin voltage V_IsetA at the current setting pin Iset is equal to the reference voltage VrefA. Therefore, in a stable state, the current IA is as follows:

$$IA = \frac{VrefA}{Rset}$$

and the current IB is as follows:

$$IB = N \times \frac{VrefA}{Rset}$$

where N is a multiplication factor corresponding to a current amplification factor on the current mirrors 412, 414. N may, for example, be equal to a value ranging from 100 to 1000, as discussed previously.

When there is noise coupling from the power rail 406 to the current setting pin Iset, the local negative feedback loop (410+M1A+Rset) will be in a transient state, rather than a stable state. If a noise signal results in a decrease of the power rail voltage VpwrA at the power rail, then parasitic coupling of the noise signal from the power rail 406 to the current setting pin Iset, due to the parasitic capacitance Cap_parA, will result in a decrease in the current setting pin voltage V_IsetA. This will result in an increase of a control signal provided by the output of the amplifier 410, which will result in an increase in a gate-source voltage Vgs(M1A) of the transistor M1A. As the transistor M1A functions as a voltage controlled current source, the current IA will increase as the current IA is as follows:

$$IA = gm(M1A) \times Vgs(M1A)$$

where gm(M1A) is a transconductance of the transistor M1A. As the current IA is mirrored to provide the current IB, then IB will also increase.

As a voltage drop across the LED 404 is directly proportional to the current IB, there will be a greater voltage drop across the LED 404, such that a voltage at a voltage pin VDA will decrease.

Due to the parasitic inductance Ind_parA on the power rail 406, there will be a further decrease in the power rail voltage VpwrA, as the current IB increases.

It will also be appreciated that noise may originate at the current setting pin Iset, rather than at the power rail 406, for example if the LED 404 is enabled or disabled, then there may be a sudden change in the current IA which can be coupled to the power rail 406 via the parasitic inductance Ind_parA, thereby resulting in a variation of the power rail voltage VpwrA.

Typically, the oscillations on the current IB are reduced by coupling a filter capacitor Cf in parallel with the setting resistor Rset, but this does not fully solve the problem and may still result in significant oscillations on the current IB.

FIG. 4B shows the power rail voltage VpwrA 416, a voltage at the voltage pin VDA 418, and the current IB 420 when noise is present on the power rail 406. The current mirror 414 is coupled to the LED 404 via the voltage pin VDA.

Noise coupling is particularly problematic in LED lighting systems using a linear current amplifier, such as the LED lighting system 400 shown in FIG. 4B. The current IA is a sufficiently small signal to be substantially affected by noise on larger signals, such as the power rail voltage VpwrA at the power rail 406.

This disclosure provides negative feedback circuit for reducing noise coupling and the associated oscillations. The negative feedback circuit may be implemented in a current regulator. Such a current regulator is suitable for use in an LED system implemented on an Al PCB. Reduced noise coupling, and therefore reduced sensitivity of the system to noise, is achieved by providing a current regulator using a negative feedback control loop, rather than the positive feedback as described for the current regulator 402 of FIG. 4A.

Figure 5A:
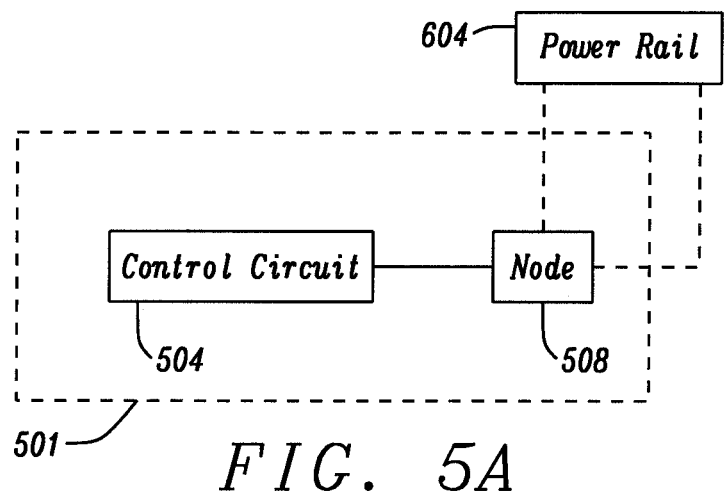
FIG. 5A is a schematic of a negative feedback circuit in accordance with a first embodiment of this disclosure.

FIG. 5A is a schematic of a negative feedback circuit 501 for reducing a noise signal at a node 508 and on a power rail 604 in accordance with a first embodiment of this disclosure. The negative feedback circuit 501 comprises the node 508 and a control circuit 504 that is coupled to the node 508. The "noise signal" corresponds to noise as discussed previously, and may result from factors relating to the external environment, for example AC line noise in AC LED applications or DC/DC regulator dynamic response ripple in an SSL backlighting system. The noise signal is an unwanted signal that can result in a variation in the power rail voltage.

In the current regulator 402 of FIG. 4A there was a positive feedback loop that resulted in oscillations at the current setting pin Iset and the power rail 406. The current setting pin Iset may be considered as being a node. Parasitic coupling resulted in a noise signal at the power rail 604 coupling to the node 508. The variation in the current IA then resulted in an in-phase noise signal being parasitically coupled back into the power rail 604.

In the negative feedback circuit 501 there is a negative feedback loop such that oscillations are substantially prevented at the node 508 and the power rail 604. A noise signal may be coupled from the power rail 604 to the node, for example by parasitic coupling. The control circuit is configured to provide a stabilizing signal in response to the noise signal coupling to the node 508 from the power rail 604. The stabilizing signal may, for example, be provided at the node 508 and parasitically coupled into the power rail 604. The stabilizing signal acts to reduce the noise signal at the power rail 604. Consequently, the reduction in the noise signal at the power rail 604, results in a reduction of the noise signal at the node 508.

It will be appreciated that with the negative feedback circuit 501 there may be some oscillations that will decay over time, however, the negative feedback circuit 501 may nonetheless be considered as stable. A stabilizing signal is any suitable signal that may be used to reduce noise and therefore maintain stability in the negative feedback circuit 501, or any appropriate circuit that uses the negative feedback circuit 501. In contrast, the positive feedback loop of the current regulator 402 results in oscillations that may not decay, or only do so over an impractically long period of time. The oscillations in the current regulator 402 are as shown in FIG. 4B.

Figure 5B:
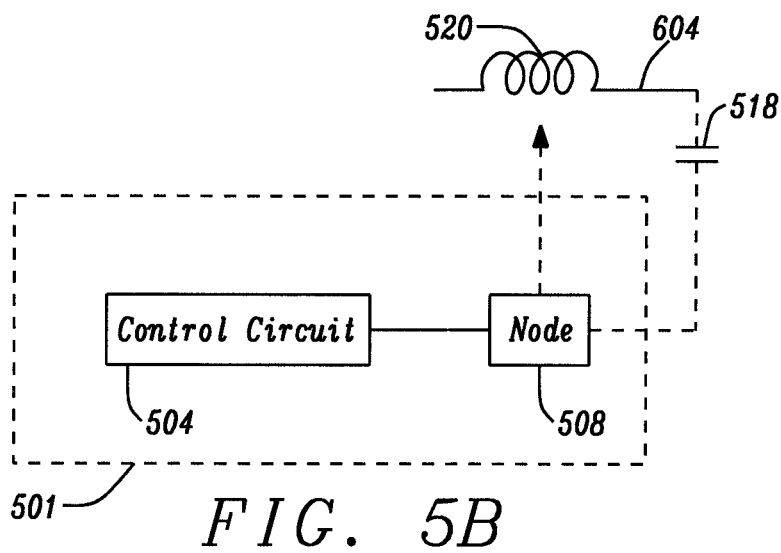
FIG. 5B is a negative feedback circuit in accordance with a second embodiment of this disclosure.

FIG. 5B is a schematic of the negative feedback circuit 501 in accordance with a second embodiment of this disclosure. Shown in FIG. 5B are a parasitic capacitance 518 and a parasitic inductance 520 to show the parasitic coupling paths from the negative feedback circuit to the power rail 604.

Figure 5C:
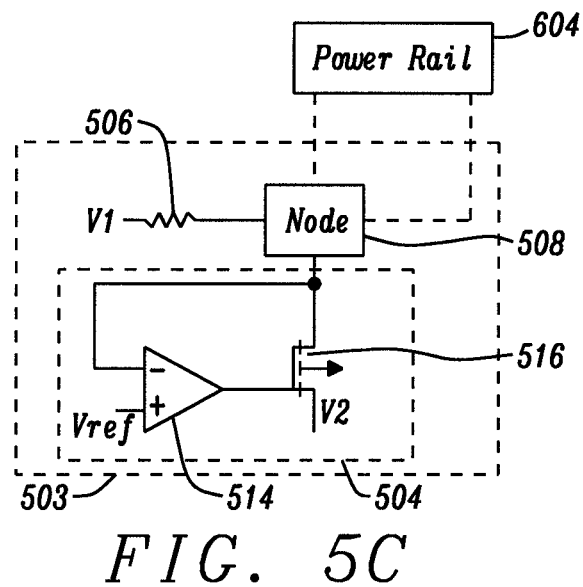
FIG. 5C is a negative feedback circuit in accordance with a third embodiment of this disclosure.

FIG. 5C is a schematic of a negative feedback circuit 503 in accordance with a third embodiment of this disclosure. The negative feedback circuit 503 comprises a resistive element 506. The resistive element 506 may, for example, be a resistor. The node 508 is coupled to a voltage V1 via the resistive element, and the node is also coupled to a second voltage V2. It will be appreciated that the term "coupled" may mean directly coupled, or coupled via another component. The voltage V1 may be greater than the voltage V2.

A specific implementation of the control circuit is shown in FIG. 5C for the negative feedback circuit 503. The control circuit comprises an amplifier 514 and a switching element 516. The amplifier 514 has a first input coupled to a reference voltage Vref and a second input coupled to the node 508. An output of the amplifier 514 is coupled to the switching element 516. In operation, the amplifier 514 outputs a control signal to control the switching element 516. The switching element 516 generates the stabilizing signal in response to the control signal.

In operation if a noise signal is parasitically coupled to the node 508 from the power supply 604, then this will be detected at the second input of the amplifier 514. In response, to the noise signal, the amplifier 514 will output a suitable control signal to the switching element 516, which will generate a suitable stabilizing signal. The stabilizing signal may be provided at the node 508 and parasitically coupled to the power rail 604, thereby reducing the noise signal on the power rail 604.

Figure 1A:
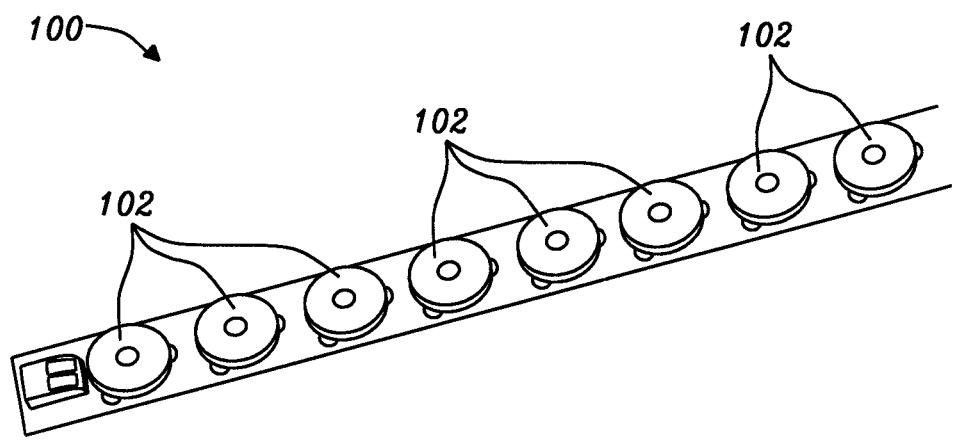
FIGS. 1A and 1B are images of LED lighting systems implemented on aluminum printed circuit boards.
Figure 1B:
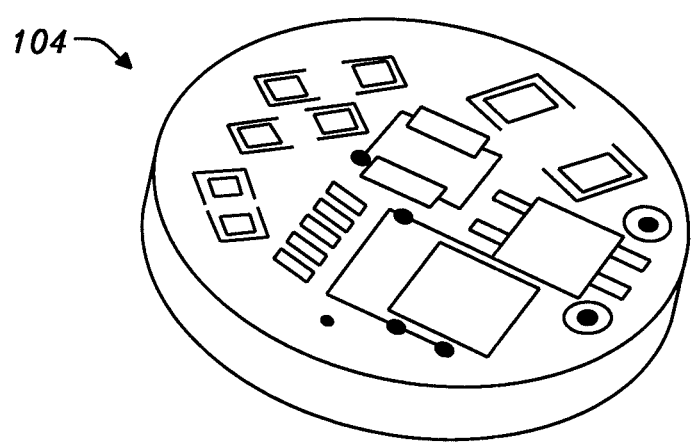
Figure 2:
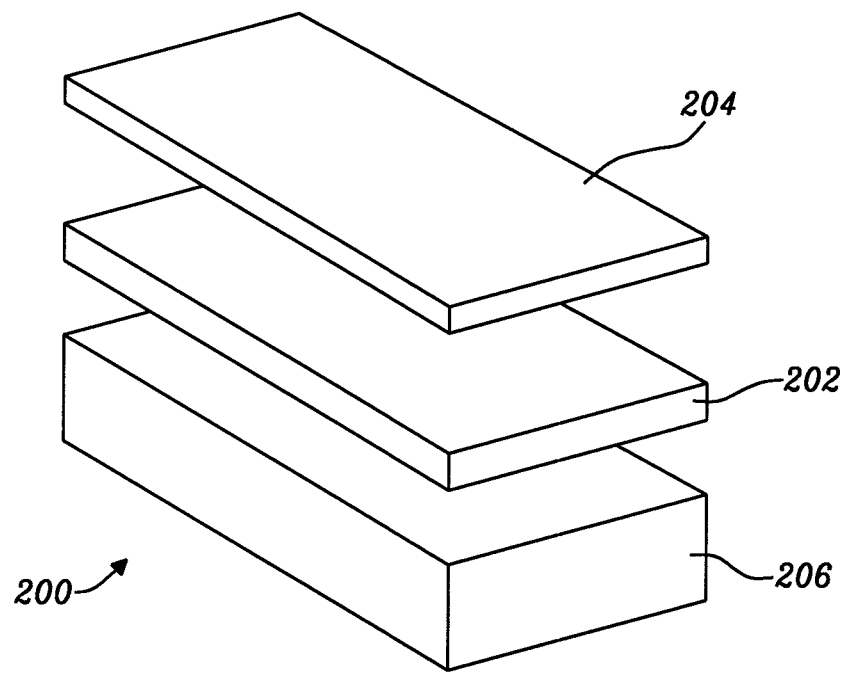
FIG. 2 is an exploded view of an aluminum printed circuit board layer structure.
Figure 3:
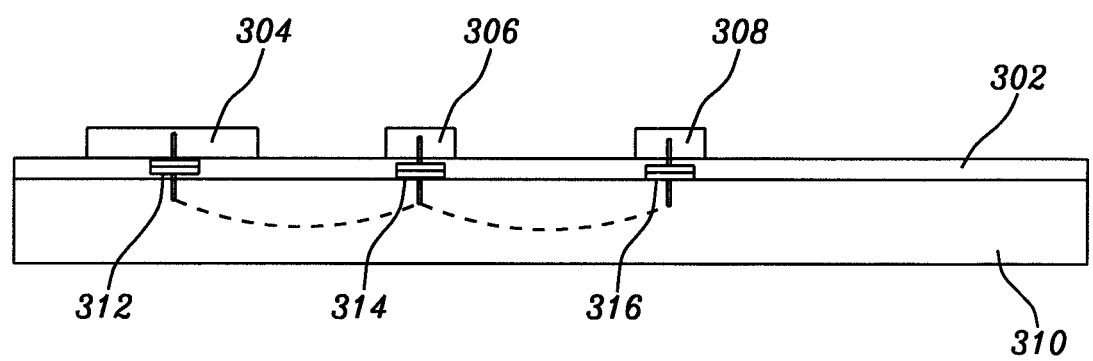
FIG. 3 is a cross section of an aluminum printed circuit board layer structure.

The negative feedback circuits 501, 503 may be implemented on a PCB comprising the power rail 604. The PCB may comprise a dielectric layer sandwiched between two metal layers, for example an Al PCB of the type shown in FIGS. 2 and 3.

Figure 5D:
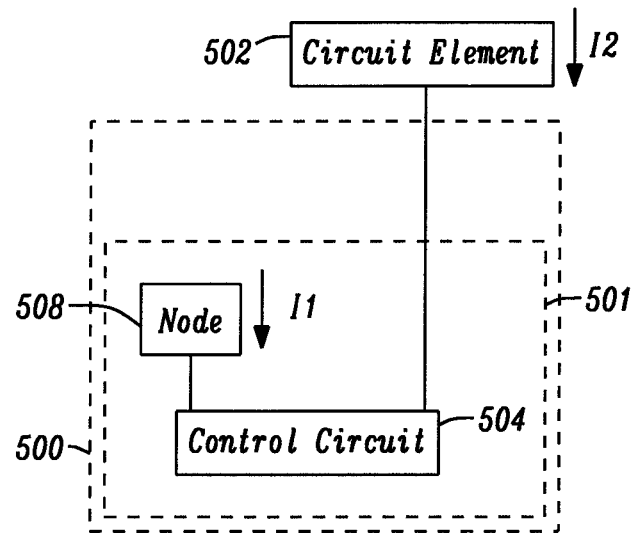
FIG. 5D is a schematic of a current regulator in accordance with a fourth embodiment of this disclosure and FIG. 5E is a schematic of a current regulator in accordance with a fifth embodiment of this disclosure.

FIG. 5D is a schematic of a current regulator 500 for regulating a current I2 through a circuit element 502, in accordance with a fourth embodiment of this disclosure. The current regulator 500 comprises the negative feedback circuit 501 as described previously. The node 508 may be referred to as a current setting pin.

The control circuit 504 is configured to provide a current I1 at the current setting pin 508. The current regulator 500 is configured to regulate the current I2 using the current I1. The control circuit 504 may be coupled to the circuit element 502.

Figure 5E:
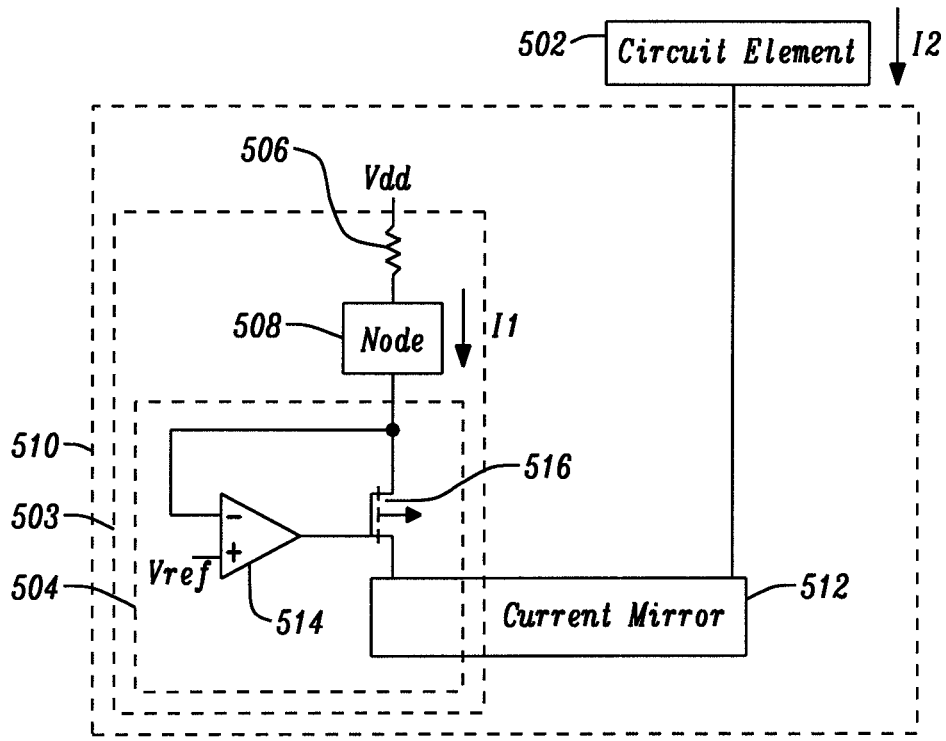

FIG. 5E is a schematic of a current regulator 510 for regulating a current I2 through a circuit element 502, in accordance with a fifth embodiment of the present disclosure. The current regulator 510 comprises the negative feedback circuit 503 as described previously.

The resistive element 506 may, for example, be a resistor and may correspond to the setting resistor Rset as described previously. The current setting pin 508 is coupled to a supply voltage Vdd via the resistive element 506.

The current regulator 510 comprises a current mirror 512 configured to mirror the current I1. The mirrored current I1 corresponds to the current I2. Additionally, the current mirror 512 may operate as a current amplifier, such that the current I2 is equal to the current I1 multiplied by a factor that is greater than one. The circuit element 502 may be coupled to the mirror circuit 512 such that the circuit element 502 receives the current I2. The current mirror 512 may be coupled to a ground terminal.

It will be appreciated that the ground terminal may correspond to 0V, or alternatively may correspond to any other voltage that is less than the supply voltage Vdd. For example, the supply voltage may be at 0V, and the ground terminal may have a negative voltage and the current regulator 510 would function as described. Consequently, the supply voltage Vdd may more generally be referred to as a first voltage and the ground terminal may be referred to as being at a second voltage, where the first voltage may be greater than the second voltage such that there is a current path from the first voltage to the second voltage. It will be appreciated that the use of the words "first" and "second" are not intended to be limiting. Additionally, the first and second voltages as described here may take any values in accordance with the understanding of the skilled person. It will be appreciated that the supply voltage Vdd and ground may correspond to the voltage V1 and the voltage V2 as shown in the negative feedback circuit 503 of FIG. 5C, respectively, The control circuit 504 further comprises an amplifier 514 and a transistor 516. A transistor is a type of switching element. The amplifier 514 is configured to regulate the current I1 at the current setting pin 508.

The amplifier 514 has a first input coupled to a reference voltage Vref, a second input coupled to the current setting pin 508, and an output coupled to the transistor 516. In operation the amplifier 514 provides a control signal to control the transistor 516.

The current I1 is dependent on the control signal that is received by the transistor 516. As the control signal is dependent on the reference voltage Vref and a voltage at the current setting pin 508, it is possible to set the current I1 by adjusting the reference voltage Vref. The amplifier 514 is coupled to the current mirror 512 via the transistor 516.

In operation, the amplifier 514 generates a control signal that is provided to the transistor 516, which in turn sets the current I1 at the current setting pin 508. The current I1 is received by the current mirror 512. The mirrored current I1 is amplified and provided to the circuit element 502 as the current I2.

The current regulators 500, 510 may be implemented on a PCB comprising the power rail 604. The PCB may comprise a dielectric layer sandwiched between two metal layers, for example an Al PCB of the type shown in FIGS. 2 and 3.

Figures 6A, 6B:
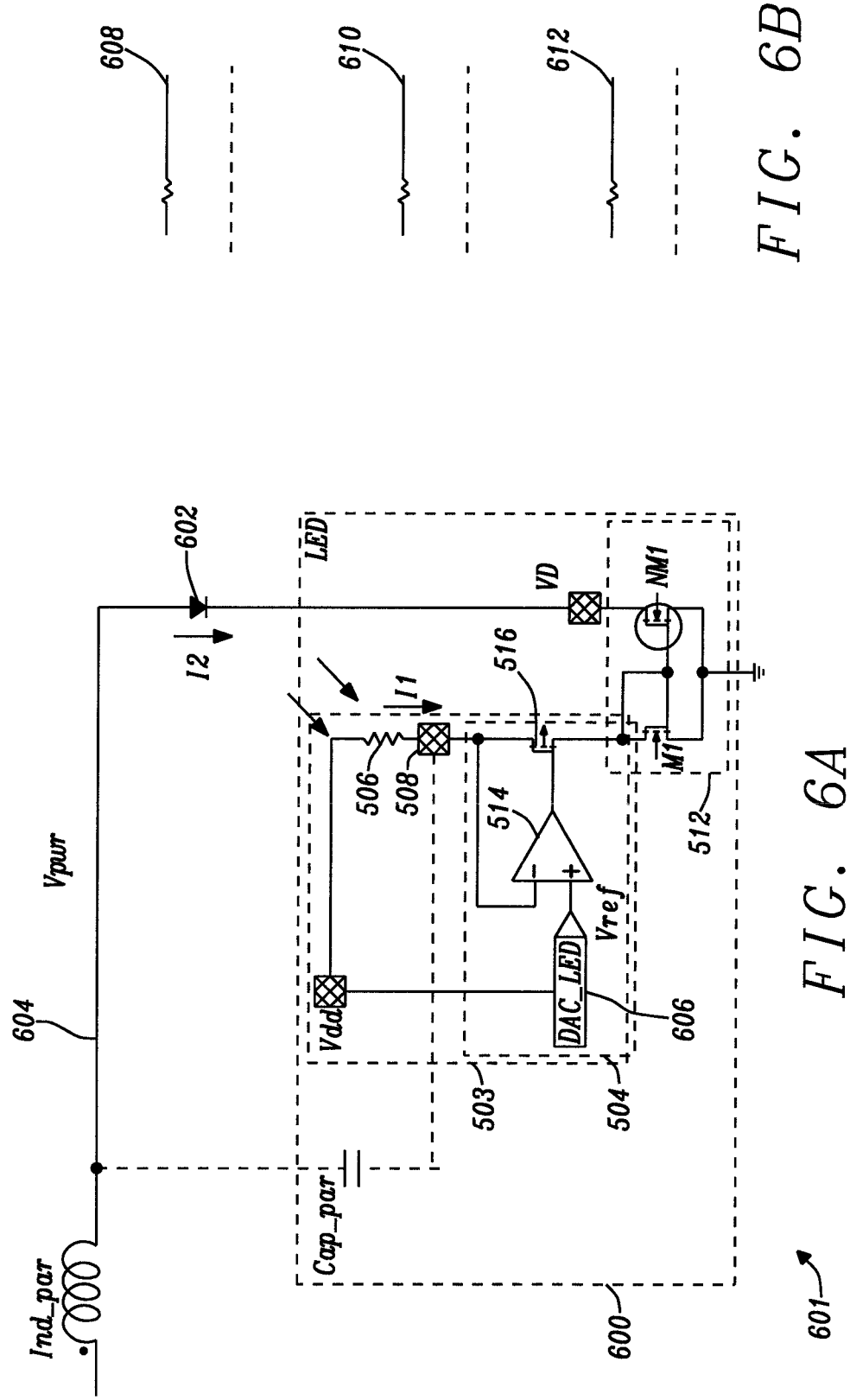
FIG. 6A is a schematic of an LED lighting system in accordance with a sixth embodiment of this disclosure and FIG. 6B shows traces of voltages and a current within the LED lighting system.

FIG. 6A is a schematic of an LED lighting system 601 comprising a current regulator 600 for regulating a current I2 through an LED 602, in accordance with a sixth embodiment of the present disclosure. The current regulator 600 comprises the negative feedback circuit 503. The current regulator 600 corresponds to the current regulators 510, but a specific embodiment of the current mirror 512, is shown. Common features between the current regulators 600, 510, 500 and the negative feedback circuits 501, 503 are represented by common reference numerals and variables.

The LED 602 corresponds to the circuit element 502 as shown in FIG. 5D and FIG. 5E. It will be appreciated that a circuit element may refer to one or a plurality of light emitting diodes. For example, a circuit element may refer to an LED string comprising a plurality of LEDs.

A power rail 604 is coupled to a first terminal of the LED 602 and the current regulator 600 is coupled to a second terminal of the LED 602. The power rail is at a power rail voltage Vpwr. As in the LED system 400, the power rail voltage Vpwr may be generated directly using wall utility power for AC LED applications or may be generated using a DC/DC converter in an SSL backlighting system.

The amplifier 514 has an input coupled to a digital to analog converter (DAC) 606 which provides the reference voltage Vref. The DAC 606 is preferably coupled to the supply voltage Vdd. The DAC 606 operates substantially as described previously for the DAC 411 of the current regulator 402.

In a stable state, the current I1 is as follows:

$$I1 = \frac{Vdd - Vref}{R(506)}$$

where R(506) is a resistance of the resistive element 506. Therefore if there is a large variation in the supply voltage Vdd between different chips, there will also be a variation in current I1 across chips. Therefore it is preferable that the reference voltage Vref refers to the supply voltage, as is shown in FIG. 6A, where the supply voltage Vdd is coupled to the DAC 606. By way of example, if I1 is set to 0.1 mA, then R(506)=5 Kohm; and Vref=Vdd−0.5V.

A specific implementation of the current mirror 512 is shown. The current mirror 512 comprises two transistors M1, NM1 and is configured to mirror the current I1 from the current setting pin 508. The current I1 is amplified by the current mirror 512 to provide the current I2 at the LED. As before, for the current regulator 400, the current I1 may, for example, be amplified by a factor ranging from 100 to 1000 in the generation of the current I2.

A parasitic capacitance Cap_par is shown on FIG. 6A to illustrate the noise coupling path from the power rail 604 to the current setting pin 508; and a parasitic inductance Ind_par is shown on the power rail 604. As discussed previously, the parasitic capacitance Cap_par and the parasitic inductance Ind_par are not physically implemented in the circuit, and the circuit symbols are only shown to represent their impact on the LED lighting system 601.

The current regulator 600 operates substantially as described previously for the current regulators 500, 510.

As discussed previously for the LED lighting system 400, noise on the power rail 604 can result in a voltage oscillation of the power rail voltage Vpwr. The noise will couple to the current setting pin 508 through the Al PCB and as a result the current I1 will be altered. The variation of the current I1 due to noise results in an out-of-phase noise signal being coupled into the power rail 604 via the parasitic inductance Ind_par. The out-of-phase noise signal corresponds to the stabilizing signal as discussed previously. As a result, a negative feedback loop comprising the power rail 604 and the current setting pin 508 is formed. The negative feedback loop is such that the current I1 and the power rail voltage Vpwr will settle to their initial values, rather than oscillating as was the case for the LED lighting system 400. Therefore the negative feedback loop of the current regulator 600 is used to reduce the sensitivity of the current regulator 600 to noise when implemented on a PCB, such as an Al PCB.

For example, a noise signal resulting in a decrease of the power rail voltage Vpwr at the power rail 604 can result in a decrease of the current I1 which will result in a decrease of the current I2. Due to the negative feedback loop, the decrease in the current I1 will result in an increase of the power rail voltage Vpwr which will lead to the eventual settling of the power rail voltage Vpwr and the current I1, as they return to their values as they were prior to the occurrence of noise on the power rail 604.

A local negative feedback loop (514+516+506) is formed by the amplifier 514, the transistor 516 and the setting resistor 506. In the present example, the transistor 516 is a PMOS transistor. The local negative feedback loop (514+516+506) acts to ensure that a current setting pin voltage V_Iset1 at the current setting pin 508 is equal to the reference voltage Vref. Therefore, as described previously, in a stable state, the current I1 is as follows:

$$I1 = \frac{Vdd - Vref}{R(506)}$$

and the current I2 is as follows:

$$I2 = N \times \frac{Vdd - Vref}{R(506)}$$

where N is a multiplication factor corresponding to a current amplification factor on the current mirror 512. N may, for example, be equal to a value ranging from 100 to 1000, as discussed previously.

When there is noise coupling from the power rail 604 to the current setting pin 508, the local negative feedback loop (514+516+506) will be in a transient state, rather than a stable state. If a noise signal results in a decrease of the power rail voltage Vpwr at the power rail 604, then parasitic coupling of the noise signal from the power rail 604 to the current setting pin 508, due to the parasitic capacitance Cap_par will result in a decrease in the current setting pin voltage V_Iset1. This will result in an increase in the control signal provided by the output of the amplifier 514, which will result in a decrease of a gate source voltage Vgs(516) of the transistor 516. As the transistor 516 functions as a voltage controlled current source, the current I1 will decrease as the current I1 is as follows:

$$I1 = gm(516) \times Vgs(516)$$

where gm(516) is a transconductance of the transistor 516. As the current I1 is mirrored to provide the current I2, then I2 will also decrease.

As a voltage drop across the LED 602 is directly proportional to the current I2, there will be a smaller voltage drop across the LED 602, such that a voltage at a voltage pin VD will increase.

Due to the parasitic inductance Ind_parA on the power rail 604, there will be an increase in the power rail voltage Vpwr, as the current I2 increases.

Additionally, the negative feedback loop substantially eliminates the requirement for a filter capacitor on the current setting pin 508, as is present in the LED lighting system 400.

The current regulators 500, 510, 600 may be implemented on a PCB. The PCB may comprise a dielectric layer sandwiched between two metal layers, for example an Al PCB of the type shown in FIGS. 2 and 3.

FIG. 6B shows the power rail voltage Vpwr 608, a voltage at a voltage pin VD 610, and the current I2 612 when noise is present on the power rail 604. The transistor NM1 is coupled to the LED 602 via the voltage pin VD. It can be observed that using the current regulator 600 substantially eliminates the occurrence of oscillations in the power rail voltage Vpwr and in the current I2.

The LED lighting systems 400, 601 were simulated using typical simulation parameters corresponding to a practical system for different parasitic capacitance and parasitic inductance values. A summary of the results are provided in the tables below. The first table corresponds to an LED lighting system having a current IB, I2 equal to 50 A, and the second table corresponds to an LED lighting system having a current IB, I2 equal to 50 mA. In the table, use of "oscillation" denotes that an oscillation was present on the current IB, I2 for that particular simulation, and "no oscillation" means no oscillation was present on the current IB, I2, or that the oscillation decayed after a suitably short period of time. From the tables below it can be observed that the LED lighting system 601 exhibits no oscillation on the current I2 for all simulated parasitic capacitances, parasitic inductances and currents I2. Oscillations are however present on the current IB of some of the LED lighting system 400 simulations.

| LED Current (current IB, I2) = 50 A | | | |
| --- | --- | --- | --- |
| Parasitic Capacitor (pF) | Parasitic Inductor (uH) | LED lighting system 400 | LED lighting system 601 |
| 0 | 0.01 | no oscillation | no oscillation |
|   | 0.1 | no oscillation | no oscillation |
|   | 1 | no oscillation | no oscillation |
|   | 10 | no oscillation | no oscillation |
| 5 | 0.01 | no oscillation | no oscillation |
|   | 0.1 | no oscillation | no oscillation |
|   | 1 | oscillation | no oscillation |
|   | 10 | oscillation | no oscillation |
| 20 | 0.01 | no oscillation | no oscillation |
|   | 0.1 | oscillation | no oscillation |
|   | 1 | oscillation | no oscillation |
|   | 10 | oscillation | no oscillation |

| LED Current (current IB, I2) = 50 mA | | | |
| --- | --- | --- | --- |
| Parasitic Capacitor (pF) | Parasitic Inductor (mH) | LED lighting system 400 | LED lighting system 601 |
| 0 | 0.01 | no oscillation | no oscillation |
|   | 0.1 | no oscillation | no oscillation |
|   | 1 | no oscillation | no oscillation |
|   | 10 | no oscillation | no oscillation |
| 5 | 0.01 | no oscillation | no oscillation |
|   | 0.1 | no oscillation | no oscillation |
|   | 1 | oscillation | no oscillation |
|   | 10 | oscillation | no oscillation |
| 20 | 0.01 | no oscillation | no oscillation |
|   | 0.1 | oscillation | no oscillation |
|   | 1 | oscillation | no oscillation |
|   | 10 | oscillation | no oscillation |

Figure 7:
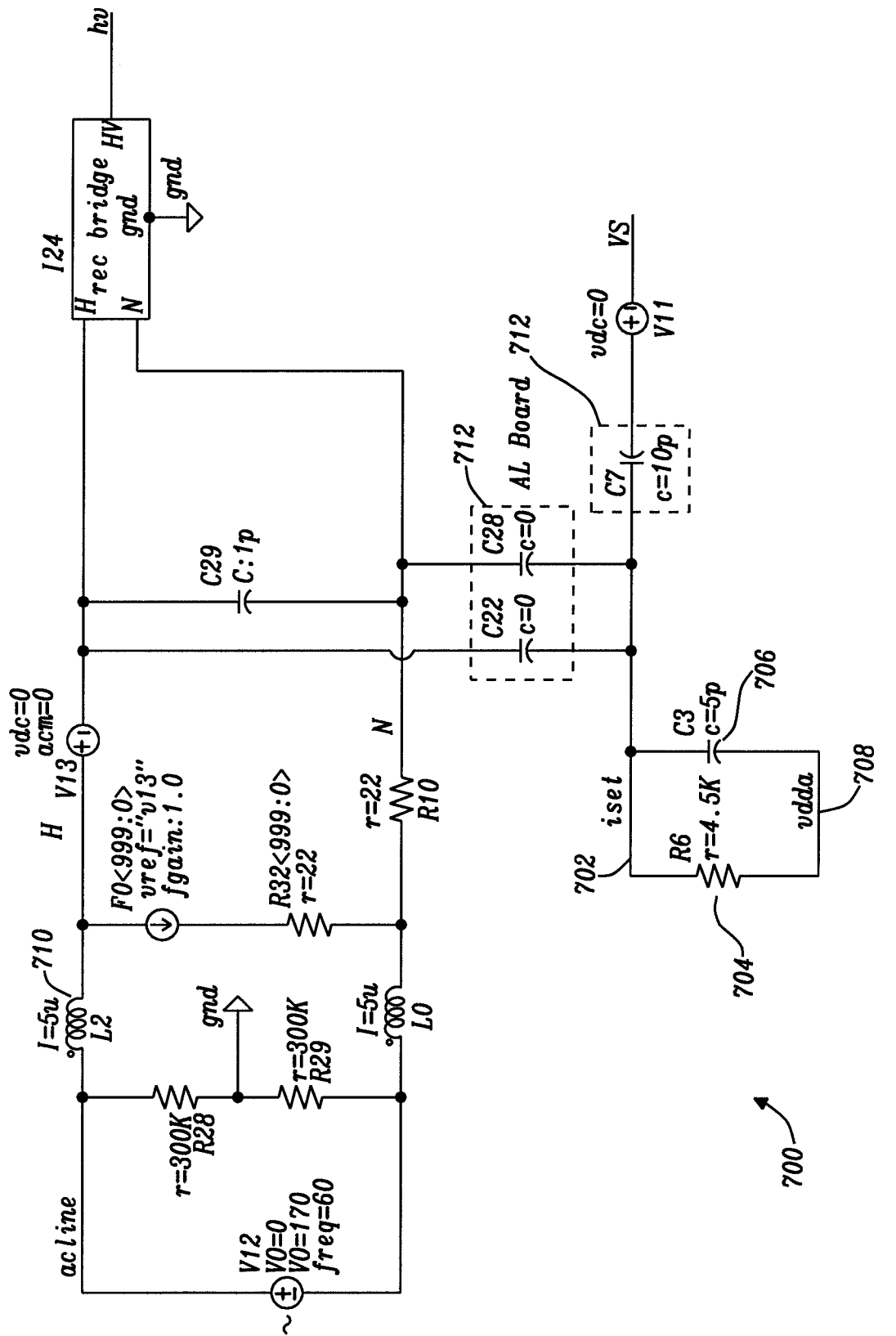
FIG. 7 is a simulation layout of an LED lighting system.

FIG. 7 shows a layout 700 of the simulation for simulation of the LED lighting systems 400, 601. Shown on the layout 700 are a current setting pin 702, a setting resistor 704, a filter capacitor 706, a supply voltage line 708, a parasitic inductance 710 and parasitic capacitance 712. It will be clear to the skilled person how these components relate to the features of the LED lighting systems 400, 601 as previously described. For the simulations of the LED lighting system 400, the supply voltage line 708 was at 0V or at ground, and for simulations of the LED lighting system 601, the supply voltage line 708 was at a supply voltage (for example Vdd as previously described).

Figure 8:
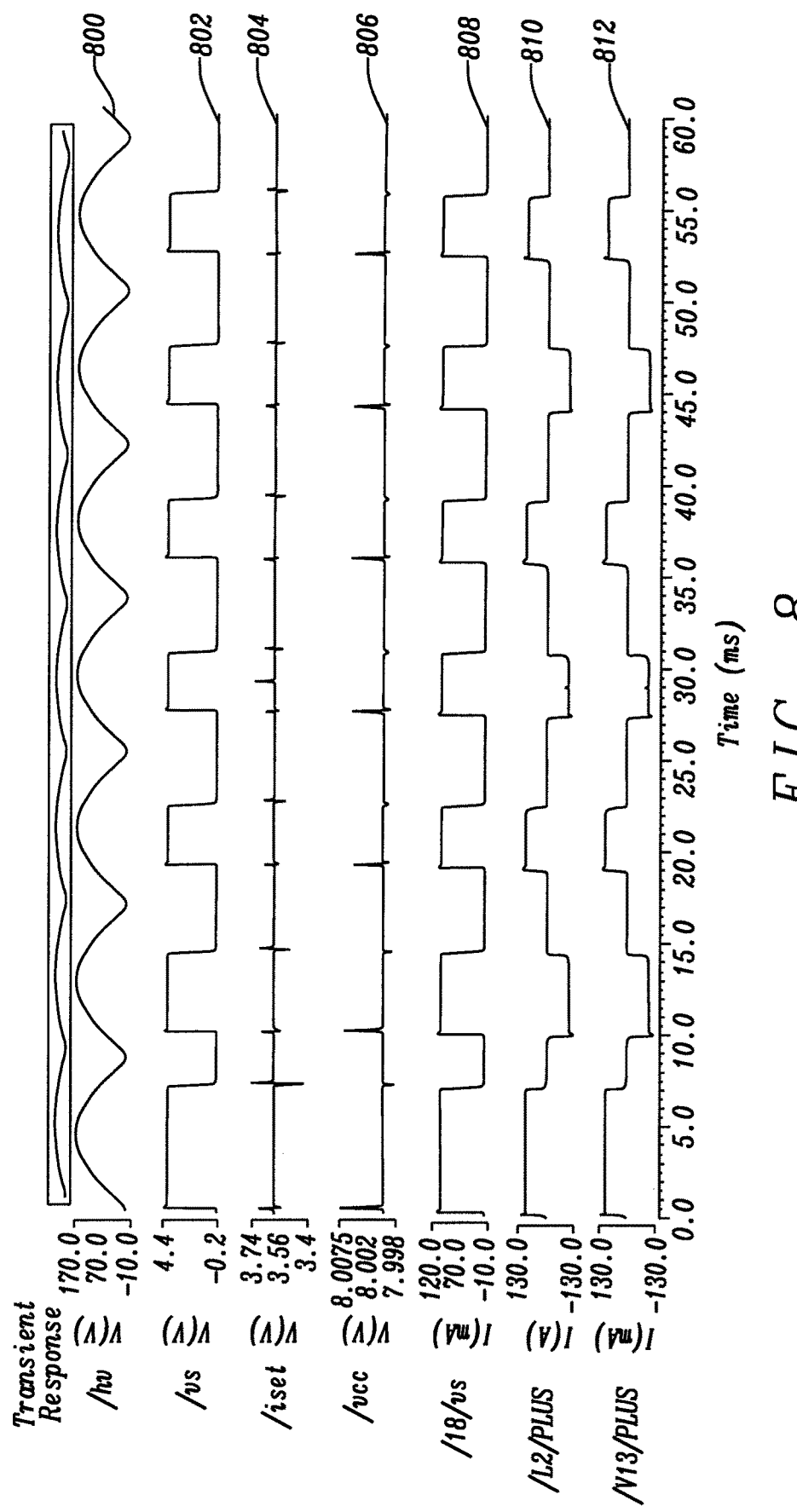
FIG. 8 is a simulation result relating to the LED lighting system shown in FIG. 6A.

FIG. 8 show a simulation result of the LED lighting system 601 where the supply voltage line 708 was at a supply voltage, and no oscillations are present.

The traces shown on FIG. 8 are as follows: the power rail voltage Vpwr 800, the voltage at the voltage pin VD 802, the current setting pin voltage V_Iset1 804, the supply voltage Vdd 806, the magnitude of the current I1 808, the current I2 810 and the current I1 812.

Figure 9:
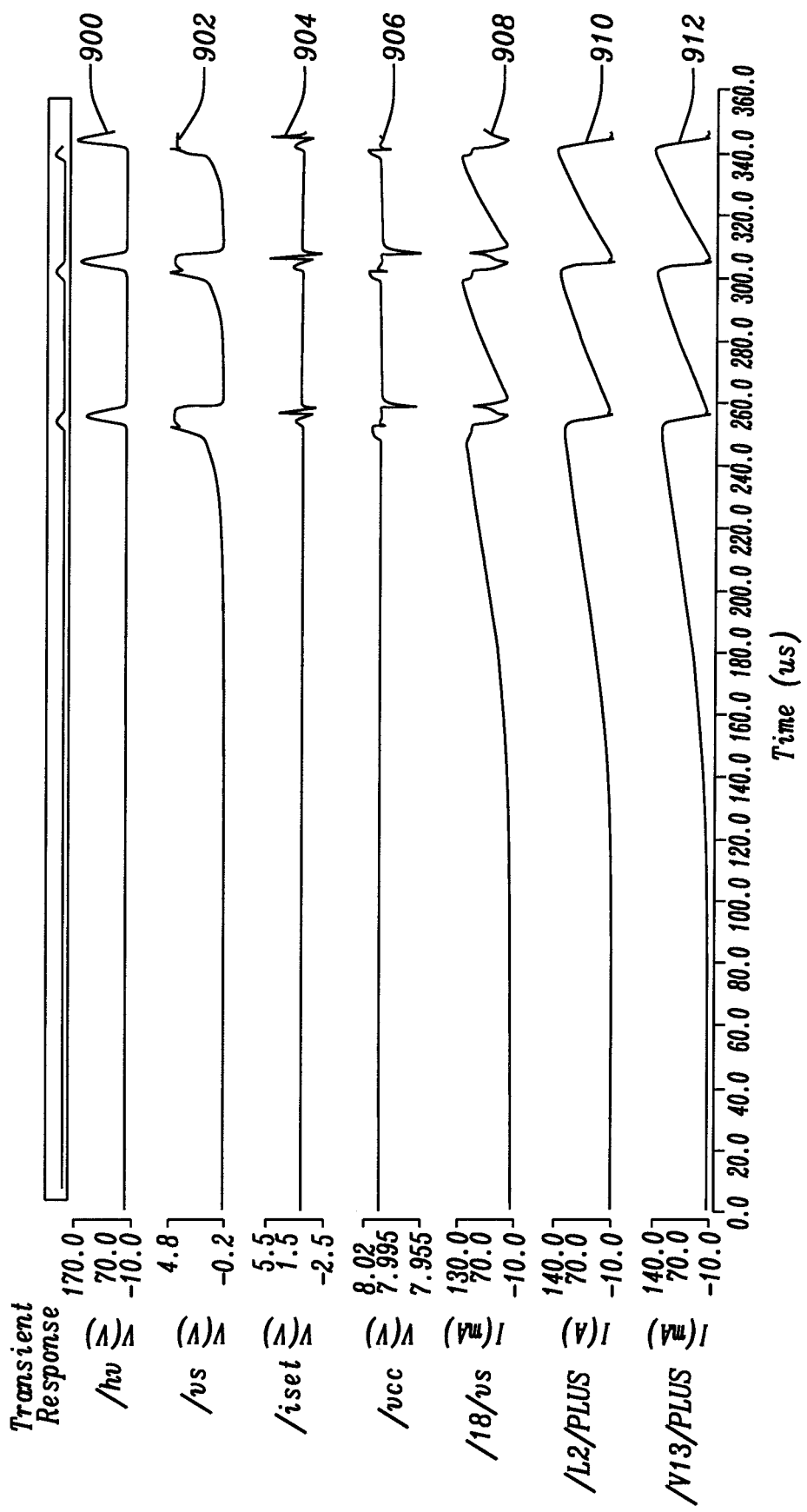
FIG. 9 is a simulation result relating to the LED lighting system shown in FIG. 4A.

FIG. 9 show a simulation result of the LED lighting system 400 where the supply voltage line 708 was at ground and were present.

The traces shown on FIG. 9 are as follows: the power rail voltage VpwrA 900, the voltage at the voltage pin VDA 902, the current setting pin voltage V_IsetA 904, the supply voltage VddA 906, the magnitude of the current IA 908, the current IB 910 and the current IA 912.

Both FIG. 8 and FIG. 9 correspond to simulations as shown on the table above, where the current IB, I2 was equal to 50 A, the parasitic inductance was equal to 1 µH and the parasitic capacitance was equal to 5 pF.

The present disclosure has been described for an Al PCB, however it will be appreciated that the disclosure may be used with any suitable PCB in accordance with the understanding of the skilled person. The disclosure provides particular benefits to an Al PCB, however it may also be used with other PCB types, such as a FR-4 PCB.

Figure 10:
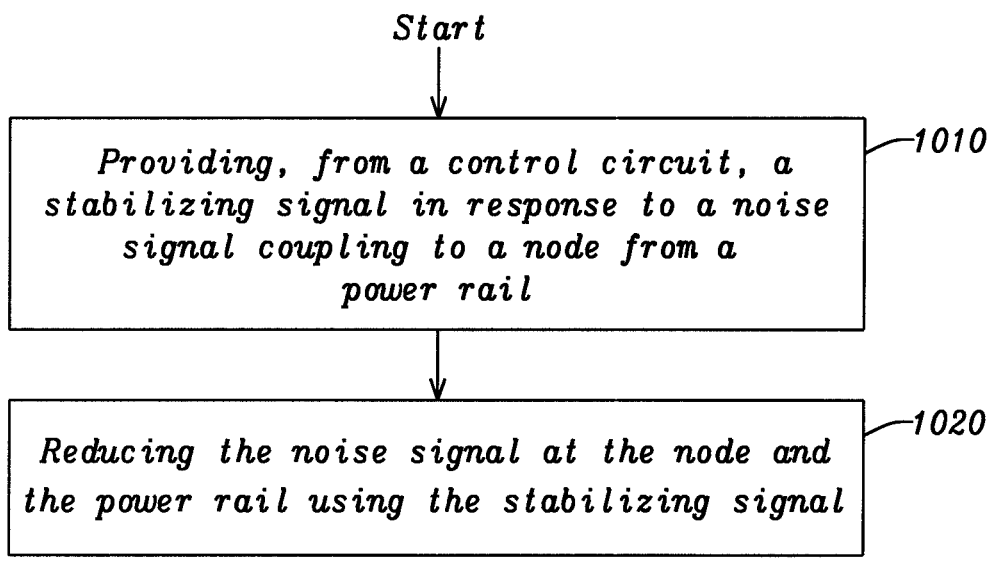
FIG. 10 is a flowchart of a method of operating an apparatus comprising a negative feedback circuit.

FIG. 10 shows a method of operating an apparatus comprising a negative feedback circuit, wherein the negative feedback circuit comprises a node and a control circuit, the control circuit being coupled to the node. The method comprises step 1010, providing, from the control circuit, a stabilizing signal in response to a noise signal coupling to the node from a power rail, and step 1020, reducing the noise signal at the node and the power rail using the stabilizing signal.

Various improvements and modifications may be made to the above without departing from the scope of the disclosure.

What is claimed is:

1. An apparatus comprising:
    a current regulator for regulating a current through a circuit element, comprising:
        a node;
        a control circuit configured to provide a first current at the node; and
        a negative feedback circuit, comprising:
            the node; and
            the control circuit coupled to the node; wherein:
                the control circuit is configured to provide a stabilizing signal in response to a noise signal coupling to the node from a power rail; and
                the stabilizing signal is configured to reduce the noise signal at the node and the power rail by being parasitically coupled into the power rail from the node, the stabilizing signal being out-of-phase with respect to the noise signal, thereby resulting in a negative feedback loop being formed between the node and the power rail.

2. The apparatus of claim 1, wherein the negative feedback circuit comprises:
    a resistive element; wherein:
    the node is coupled to a first voltage via the resistive element;
    the node is coupled to a second voltage; and
    the first voltage is greater than the second voltage.

3. The apparatus of claim 1, wherein the control circuit comprises:
    an amplifier; and
    a switching element; wherein:
        the amplifier has a first input coupled to a reference voltage, a second input coupled to the node, and an output coupled to the switching element;
        the amplifier provides a control signal to control the switching element; and
        the switching element generates the stabilizing signal.

4. The apparatus of claim 3, wherein:
    the amplifier is configured to regulate the first current at the node; and
    the first current is dependent on the control signal received by the switching element.

5. The apparatus of claim 1, wherein the current regulator is configured to regulate a second current using the first current.

6. The apparatus of claim 5, wherein the current regulator comprises a current mirror configured to mirror the first current, wherein the mirrored first current is the second current.

7. The apparatus of claim 6, wherein the current mirror operates as a current amplifier, such that the second current is equal to the first current multiplied by a factor that is greater than one.

8. The apparatus of claim 1, wherein the circuit element corresponds to one or a plurality of light emitting diodes.

9. The apparatus of claim 1, wherein the circuit element is coupled to the power rail.

10. The apparatus of claim 1, comprising a printed circuit board comprising the power rail.

11. The apparatus of claim 10, wherein the printed circuit board comprises a dielectric layer sandwiched between two metal layers.

12. The apparatus of claim 10 comprising the circuit element.

13. The apparatus of claim 12, wherein the printed circuit board comprises a dielectric layer sandwiched between two metal layers.

14. The apparatus of claim 12, wherein the circuit element corresponds to one or a plurality of light emitting diodes.

15. The apparatus of claim 12, wherein:
    the current regulator comprises a current mirror configured to mirror the first current, wherein the mirrored first current is a second current; and
    the circuit element is coupled to the current mirror such that the circuit element receives the second current.

16. A method of operating an apparatus comprising a current regulator for regulating a current through a circuit element, comprising a node, a control circuit configured to provide a first current at the node, and a negative feedback circuit, wherein the negative feedback circuit comprises the node and the control circuit, the control circuit being coupled to the node, the method comprising:
    providing, from the control circuit, a stabilizing signal in response to a noise signal coupling to the node from a power rail; and
    reducing the noise signal at the node and the power rail using the stabilizing signal by being parasitically coupled into the power rail from the node, the stabilizing signal being out-of-phase with respect to the noise signal, thereby resulting in a negative feedback loop being formed between the node and the power rail.

17. The method of claim 16, wherein the negative feedback circuit is implemented on a printed circuit board.

18. The method of claim 16, wherein the apparatus comprises a current regulator comprising the node, the control circuit and the negative feedback circuit, the method comprising providing, using the control circuit, a first current at the node.

* * * * *